April 1, 1958   R. LUCIEN ET AL   2,828,960
FLUID SUSPENSION SYSTEM FOR VEHICLES
Filed Jan. 18, 1956   2 Sheets-Sheet 2
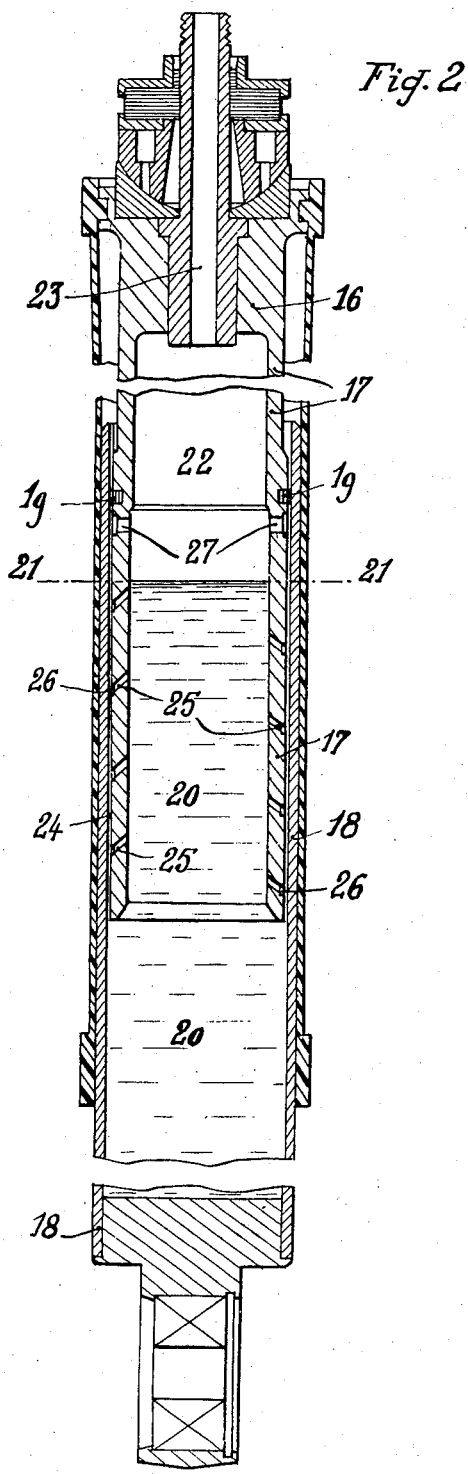

United States Patent Office

2,828,960
Patented Apr. 1, 1958

2,828,960

FLUID SUSPENSION SYSTEM FOR VEHICLES

René Lucien, Neuilly-sur-Seine, and Emile Tetart, Louvie-Juzon, France, assignors to Societe d'Inventions Aeronautiques et Mecaniques S. I. A. M., Fribourg, Switzerland, a corporation of Switzerland Application January 18, 1956, Serial No. 560,029

Claims priority, application France January 24, 1955

4 Claims. (Cl. 267—64)

It is known that there exist numerous systems of pneumatic or oleo-pneumatic suspensions for vehicles. The present invention has for its object a system of mixed suspension which is distinguished from previously known systems by the fact that it combines within the interior of a single shock-absorber body, the shock-absorbing effect resulting from the viscosity forces produced within a liquid in the state of a thin, stable and continuous film, with the action of compressed air.

This system provides especially for the problem of suspension of automobile vehicles, a solution which is at the same time economical and easy to adapt to existing vehicles. In this solution, the shock-absorbers in accordance with the invention co-operate with the usual springs. For example, in order to equip a vehicle provided with leaf springs and telescopic hydraulic shock-absorbers of known type, the latter are replaced by the shock-absorbers in accordance with the invention which operate at the same time by viscosity and by compressed air.

The shock-absorbers in accordance with the invention may, of course, also provide by themselves the suspension of the vehicle, thus completely dispensing with the usual springs.

The shock-absorbers in accordance with the invention are a development of those which form the subject of the American patent application Ser. No. 416,842 of March 17, 1954, for "A Method of and Means for Damping Oscillations Parallel to a Shaft." They are characterised by the fact that, instead of comprising as in the previous case referred to, a single sliding sleeve, they are provided with a fluid-tight piston which, on the one hand, is mounted above a chamber containing air under pressure and, on the other hand possesses an annular chamber containing a viscous liquid which creates and maintains through small orifices between the said chamber and the cylinder, a continuous and stable film which provides a drag on the relative motion between the piston and cylinder and thereby ensures the damping of the oscillations in both directions. According to application Serial No. 416,842 this damping is ensured—without any forced channelling whatsoever of the liquid—by the fact that the relative motion of the cylindrical shock-absorbing body and the sliding sleeve causes in the thin liquid film therebetween viscosity forces which oppose this motion. These forces are the well-known conventional viscosity forces, which develop on any surface in motion submerged in a liquid and which obey the conventional thermodynamic laws of the viscosity phenomenon. It will be recalled that, for example, if a surface moves parallel to another surface at a distance "$e$" of this surface in a cinematic viscosity liquid "$\eta$" at a speed "$V$" such that the rate is permanent, a force "$F$" due to the viscous fluid acts on an area "$S$" of this surface, said force being:

$$F = \eta S \frac{V}{e}$$

Likewise, in the particular case of the invention, the forces, and, consequently, the resulting shock-absorbing effect, are proportional to the viscosity coefficient of the oil, to the area of the cooperating surfaces, to the relative speed of the same in relation to each other, and they are inversely proportional to the thickness of the oil film. In addition, the piston rod is hollow and serves to connect the said chamber to an accumulator of compressed air.

The invention is illustrated in the attached drawings in which:

Fig. 2 is a view in longitudinal axial cross-section showing an alternative form of embodiment of the device.

Figure 1:
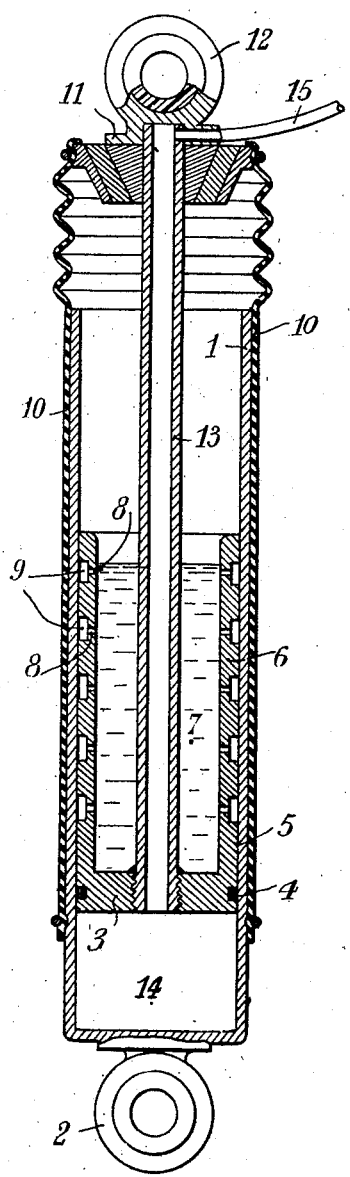
Fig. 1 is a view in longitudinal axial cross-section of a combined shock-absorber.

Referring now to Fig. 1, in the cylindrical body 1 of the shock-absorber (which is pivotally mounted at 2, for example, on the non-suspended portion of the vehicle) is arranged to move a piston 3 having fluid-tight packings 4. An annular space 5 of a few hundredths of a millimetre, is formed between the cylinder and the skirt 6 of the piston, which has a height sufficient to form a chamber 7, filled with a suitable viscous liquid, for example silicone. A suitable viscosity will be of the order of 1,000 to 30,000 centistokes and viscous will hereinafter be understood as indicating a fluid capable of providing a drag between two movable elements This liquid constantly fills the annular clearance 5 by virtue of the presence of the small supply orifices 8, which pass through the skirt 6 and effect a communication between the liquid mass 7 and a spiral groove 9 formed in the external surface of the skirt. The thin, continuous viscous film thus maintained in the said space 5 effects a braking action on oscillations in both directions.

The body 1 of the shock-absorber is enclosed in a flexible sheath 10, of rubber for example, which protects the interior of the device against the ingress of mud and dust, and against the action of external agents. This sheath is formed in the shape of a bellows at its upper portion, and is fixed to a plate 11 carrying an end portion 12 by means of which the shock-absorber is pivotally attached to the suspended part of the vehicle.

The rod 13 of the piston is hollow and opens into the chamber 14 situated below the piston. The interior channel of this rod is coupled to a flexible tube 15 which is connected to an accumulator of compressed air.

In the alternative form of embodiment shown in Fig. 2, the skirt of the piston is located opposite to the piston rod. The viscous liquid which generates the film fills this skirt and the lower part of the cylinder in the space occupied in the previous embodiment by the compressed-air chamber, whilst the latter is now located above the level of the liquid in the upper space inside the skirt.

As in the previous case, this compressed-air chamber is connected to a compressed-air accumulator. As regards the sealing joint, this is now located near the top of the moving portion instead of being provided near the base. The piston 16 of the shock-absorber is extended by a long, hollow skirt 17 which is movable in a fluid-tight manner inside the cylinder 18, by virtue of one or a number of packing rings 19.

The viscous liquid 20 fills the whole of the lower part of the cylinder and a part of the skirt 17, for example up to the level 21—21. The chamber 22, above this level, is filled with air under pressure by reason of its communication, through the hollow rod 23 of the piston, with a pneumatic or oleo-pneumatic accumulator.

In the example shown in Fig. 2, the viscous liquid constantly fills the annular clearance 24, of a few hundredths of a millimetre, provided between the skirt 17 and the cylinder 18, through the intermediary of small feeding orifices 25 and a spiral groove 26. The orifice 27 in the vicinity of the packing 19, has a diameter greater than that of the other orifices, since it is provided to compensate for the scraping of the walls of the cylinder by this joint.

As in the example shown in Fig. 1, the visco-pneumatic shock-absorbers in accordance with the invention, combined with the accumulator, may be used if so desired in co-operation with the usual springs, whether the latter are of the leaf type or of the spiral type or if they are constituted by torsion bars. In this co-operation, it is an advantage to arrange matters so that the weight of the vehicle is mainly balanced by the pressure of the accumulator, the latter being easily regulated and remaining substantially constant by reason of the volumes employed. The result of this is that the characteristics of the standard springs employed can be reduced, since they then have only to ensure the suspension in respect of a mass already balanced by the pressure of the accumulator.

What we claim is:

1. A shock absorber for a vehicle comprising a fluid-tight cylinder, a piston adapted to move inside said cylinder and defining therewith an annular clearance, a thin, continuous and stable film of a viscous liquid in the annular clearance, said film providing a drag on the relative motion between said cylinder and piston, and a fluid-tight packing between said piston and cylinder and in said annular clearance, said cylinder and piston defining a chamber containing compressed air.

2. A shock absorber in accordance with claim 1, in which the said piston is provided with a spiral groove containing the viscous liquid and communicating with the film, said compressed air chamber and said annular chamber being situated on opposite sides of said piston.

3. A shock-absorber as claimed in claim 1, comprising a rod on said piston, a hollow skirt rigidly fixed to the said piston and opposite the rod of the said piston; a viscous liquid contained in the said cylinder and in the said hollow skirt, and communicating with the said film, the said compressed air chamber being located above the free level of the said viscous liquid.

4. A shock-absorber as claimed in claim 1, comprising a rod on said piston, a hollow skirt defining an external helicoidal groove and rigidly fixed to the said piston and opposite the rod of the said piston; a viscous liquid contained in the said cylinder and in the said hollow skirt, and communicating with the said film through a plurality of small orifices leading into the helicoidal groove, the said compressed air chamber being situated above the free level of the said viscous liquid.

References Cited in the file of this patent.

UNITED STATES PATENTS

| | | |
|---|---|---|
| 1,949,288 | Wallace | Feb. 27, 1934 |
| 2,168,679 | Myers | Aug. 8, 1939 |
| 2,661,207 | Allinquant | Dec. 1, 1953 |
| 2,721,074 | Burcier de Carbon | Oct. 18, 1955 |